US006466982B1

(12) United States Patent
Ruberg (10) Patent No.: US 6,466,982 B1
(45) Date of Patent: Oct. 15, 2002

(54) EXCLUSIVE USE OF PERIPHERAL DEVICES

(75) Inventor: Alan T. Ruberg, Foster City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/289,796

(22) Filed: Apr. 9, 1999

(51) Int. Cl.[7] ........................... G06F 15/16; G06F 12/00

(52) U.S. Cl. ....................................... 709/227; 710/200
(58) Field of Search ........................... 709/227; 710/200

(56) References Cited

U.S. PATENT DOCUMENTS 5,596,754 A * 1/1997 Lomet ......................... 395/726
6,223,223 B1 * 4/2001 Kumpf et al. ............... 709/227

* cited by examiner

Primary Examiner—John A. Follansbee
(74) Attorney, Agent, or Firm—O'Melveny & Myers LLP (57) ABSTRACT

A method and apparatus for controlling the number of users that attempt to concurrently utilize a peripheral device in a network. In a network many users share various peripheral devices such as microphones, cameras, speakers, etc. In one or more embodiments of the invention, to prohibit the concurrent use of a peripheral device by multiple users, a locking mechanism is utilized. The locking mechanism allows a first user that requests access to a peripheral device to maintain an exclusive lock on that device. Once the first user has concluded using the peripheral device, the lock is released to permit another user to access the device. The locking mechanism is controlled by two protocols: the request and the grant protocols. These protocols establish the rules for exclusive access to network peripheral devices using a locking mechanism. A request includes parameters associated with the particular device, and a return address for the requesting terminal or program. The request is processed to verify the availability of the requested device and whether that device is capable to support the request based on the parameters specified. If these conditions are satisfied the request is granted. The grant protocol allows the requesting user to maintain a lock on the device for exclusive use, and monitors the locking mechanism in case of any failures. For example, if the lock on a device is not released after a user concludes the utilization of the device, the lock is released after a default period expires.

31 Claims, 7 Drawing Sheets

EXCLUSIVE USE OF PERIPHERAL DEVICES

BACKGROUND OF THE INVENTION

A. Field of the Invention

This invention relates to the field of computerized information processing, and more specifically to the exclusive use of peripheral devices in a computerized network environment. Portions of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris, "Write Once, Run Anywhere", Java, JavaOS, JavaStation and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

B. Background Art

A networked computer environment comprises a number of interconnected computer systems that provided a user with various services. One of these services includes providing network wide access to peripheral devices such as microphones, speakers, modems, cameras, printers and other sharable resources that are installed on the network or the computer terminals attached to the network.

While it is beneficial to enable network users to share network peripherals, it is also important to maintain data integrity, and confidentiality of information processed by these peripheral devices for each user. For example, a user may use a microphone linked to his computer to record confidential voice messages. It would be undesirable to allow other users to access the data being processed by the microphone at the same time as another user is utilizing it for confidential purposes. A method is needed to control the number of users that can concurrently utilize a peripheral device in a computer network. Problems relating to resource sharing in a computerized network environment can be better understood from a summary of a general description of computerized networks and communication protocols, provided below.

Networks

In modern computing environments, it is commonplace to employ multiple computers or workstations linked together in a network to communicate between, and share data with, network users. A network also may include resources, such as printers, modems, file servers, etc., and may also include services, such as electronic mail.

A network can be a small system that is physically connected by cables or via wireless communication (a local area network or "LAN"), or several separate networks can be connected together to form a larger network (a wide area network or "WAN"). Other types of networks include the Internet, telcom networks, the world wide web (WWW), intranets, extranets, wireless networks, and other networks over which electronic, digital, and/or analog data may be communicated.

Network Communication/Data Transfer

To enable the computers on a network including the WWW to communicate with each other, a set of standardized rules for exchanging the information between the computers, referred to as a "protocol", is utilized. Transfer Protocols generally specify the data format, timing, sequencing, and error checking of data transmissions. Numerous transfer protocols are used in a networking environment. For example, one family of transfer protocols is referred to as the transmission control protocol/internet protocol ("TCP/IP"). The TCP/IP family of transfer protocols is the set of transfer protocols used on the Internet and on many multiplatform networks.

SUMMARY OF THE INVENTION

A method and apparatus for controlling the number of users that can concurrently utilize a peripheral device in a computer network is described. In the computer network of this invention many users can share various peripheral devices such as microphones, cameras, speakers, modems, and other resources installed on the network's terminals. In one or more embodiments of the invention, the concurrent use of a peripheral device by multiple users is limited. In some embodiments the use may be made exclusive to one user at a time.

In one or more embodiments of the invention, to prohibit the concurrent use of a peripheral device by multiple users, a locking mechanism is utilized. The locking mechanism allows a first user that requests access to a peripheral device to maintain an exclusive lock on that device that prohibits access by other users. Once the first user has concluded using the peripheral device, the lock is released to permit another user to access the device.

In one or more embodiments of the invention, the locking mechanism is controlled by two protocols: the request and the grant protocols. These protocols establish the rules for exclusive access to network peripheral devices using a locking mechanism. In embodiments of the invention, a request for accessing a peripheral device includes parameters associated with the particular device, and a return address for the requesting terminal or program. The request is processed to verify the availability of the requested device and whether that device is capable to support the request based on the parameters specified. If these conditions are satisfied the request is granted.

In one or more embodiments of the invention, if the access request is not granted based on the parameters specified in the original request, then an attempt is made to modify those parameters. The request is then granted if the modified parameters are supported by the identified device.

The grant protocol allows the requesting user to maintain a lock on the device for exclusive use, and monitors the locking mechanism in case of any failures. For example, in one or more embodiments of the invention, if the lock on a device is not released after a user concludes the utilization of the device, the lock is released after a default period expires.

DETAILED DESCRIPTION OF THE INVENTION

A method and apparatus for controlling the number of users that attempt to concurrently utilize a peripheral device in a computer network is described. In the following description, numerous specific details are set forth in order to provide a more thorough understanding of the present invention. It will be apparent, however, to one skilled in the art that the present invention may be practiced without these specific details. However, in order not to unnecessarily obscure the invention, all various implementations or alternate embodiments including well-known features of the invention may have not been described in detail herein.

COMPUTER NETWORK ARCHITECTURE

A computer network includes multiple computers linked together via a communication medium that allows them to interconnect and interact with one another. This communication medium is sometime referred to as the interconnect fabric and includes the physical paths and the communication protocols required for transporting data to and from the computers. A client/server network model includes one or more main computers (servers) that manage the transfer of data in the network and that can serve the request submitted by other computers (clients) in the network.

One or more embodiments of the invention comprise a client/server computer architecture having one or more client computers or "terminals" in a network with one or more server computers. A terminal has the task of displaying output of services to a user and obtaining input to services from the user during a session. A session is a long-lived, persistent and reliable representation of those services which are executing on behalf of a user at any point in time. A service is a program that performs some function for a user.

A terminal has the ability to respond to a command (e.g., display command) received from, for example, a software program executing on a computational service provider. The input received from a user is forwarded to, for example, a service that is fulfilling a user request. More than one server can execute the services that comprise a session.

One or more embodiments of the invention provide a central office metaphor to computing, where services of one or more servers are provided to a terminal through a network. The terminals are configured to display data and to send keyboard, cursor, audio, and video data through the network to the processing server. Communication with the terminals from various services is accomplished by converting disparate output to a common protocol. Appropriate drivers are provided for each service to allow protocol conversion.

In one or more embodiments of the invention, multiple terminals are coupled to the network. Users can enable a unique session at any one of the terminals by inserting a "smart card" into a card reader. A smart card is a card that is capable of storing information, for example in a magnetic strip or memory of the smart card. Removing the card disables the session. Re-inserting the card into the same or any other terminal re-enables the session. Thus, a user can use any terminal on the network to access the resources and services used or available to the user by enabling a session.

The present invention provides a new computer system architecture referred to as the virtual desktop architecture. This system offers substantially greater levels of functionality at a lower cost than prior art systems. The invention provides for a re-partitioning of functionality between a central server installation and the user hardware. Data and computational functionality are provided by data sources via a centralized processing arrangement.

In one or more embodiments of the invention, at the user end, functionality is limited to include functions which generate output to the user (e.g. display and speakers), take input from the user (e.g. mouse and keyboard) or other peripherals that the user may interact with (e.g. scanners, cameras, removable storage, etc.). Users may also access and share various resources or peripheral devices that are attached to remote terminals in the network.

In embodiments of the invention, computing is done by the central data source and the computation is done independently of the destination of the data being generated. Thus, a program running at the central source can have equal access to the output or input of any device available on the network. The output of the data source is provided to a terminal. Each terminal is capable of receiving the data and displaying the data.

Virtual Desktop System Architecture

Figure 1:
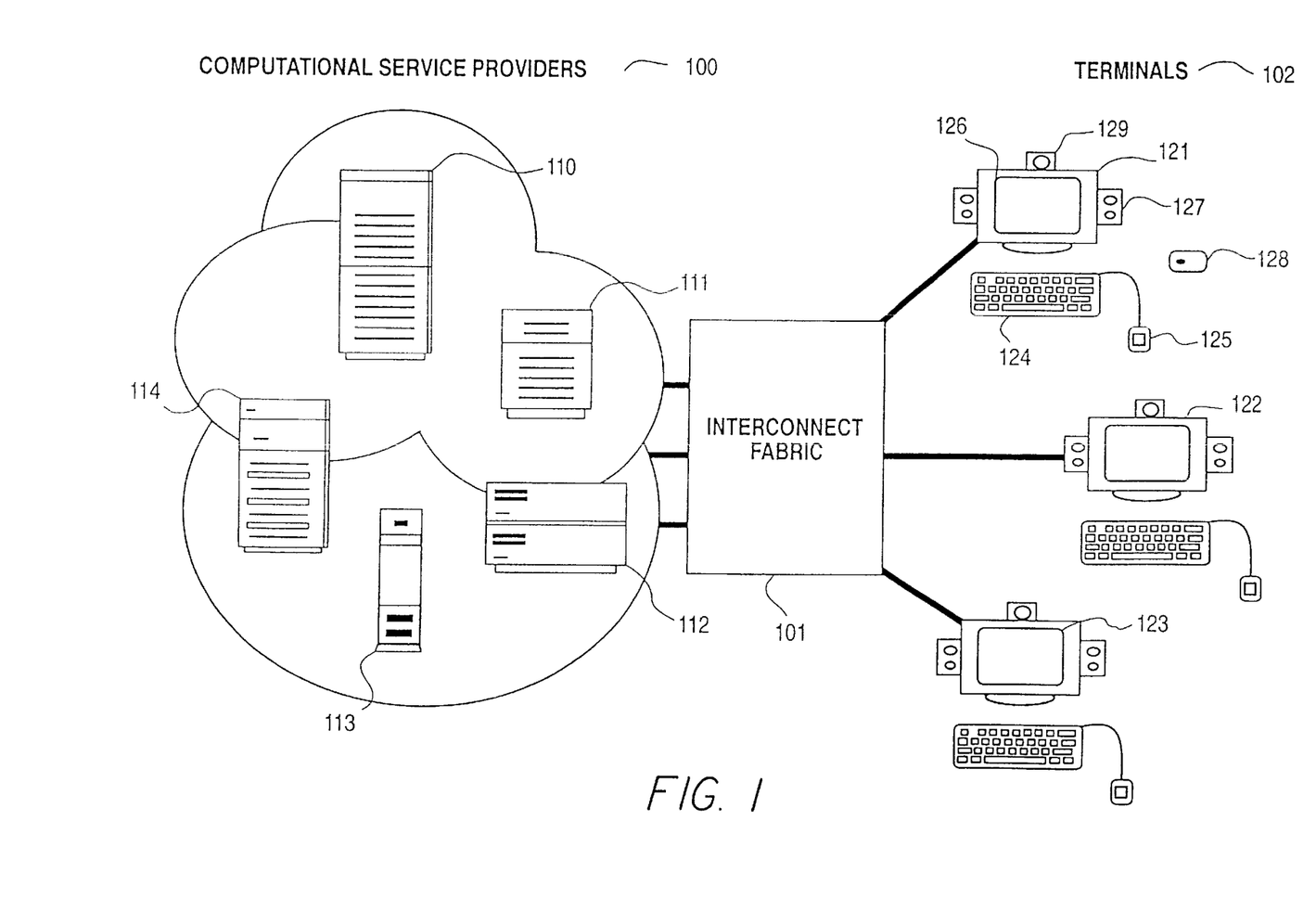
FIG. 1 is a block diagram illustrating one or more services in communication with one or more terminals through an interconnect fabric, according to one or more embodiment of the invention.

In this system the functionality of the system is partitioned between a display and input device, and data sources or services. The display and input device is a terminal. The partitioning of this system is such that state and computation functions have been removed from the terminal and reside on data sources or services. In one embodiment of the invention, one or more services communicate with one or more terminals through some interconnect fabric, such as a network. An example of such a system is illustrated in FIG. 1. Referring to FIG. 1, the system consists of computational service providers 100 communicating data through interconnect fabric 101 to terminals 102.

Computational Service Providers

In the terminal system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the terminals and the service is under the control of a common authority or manager. In FIG. 1, the services are found on computers 110, 111, 112, 113, and 114. It is important to note that the central data source can also be providing data that comes from outside of the central data source, such as for example, the Internet or world wide web. The data source could also be broadcast entities such as those that broadcast data such as television or radio signals.

Examples of services include but are not limited to Java™ program execution services, X11/Unix services, archived or live audio or video services, Windows NT service, and others. A service herein is a process that provides output data and responds to user requests and input. For example, a service may for the capturing and transmission of audio or video data from peripheral devices attached to one terminal to another.

It is the responsibility of the service to handle communications with the terminal that is currently being used to access the given service. This involves taking the output from the computational service and converting it to a standard protocol for the terminal. This data protocol conversion is handled in one embodiment of the invention by a middleware layer, such as the a variant of the java.awt.graphics class, the X11 server, the Microsoft Windows interface, a video format transcoder, the OpenGL interface, or within the service producer machine. The service machine handles the translation to and from the virtual desktop architecture wire protocol.

In an embodiment of the invention, each service is provided by a computing device optimized for its performance. For example, a Sun MediaCenter could be used to provide video service, an Enterprise class machine could be used to provide X11/Unix service, a Hydra based NT machine could provide applet program execution service.

The service producing computer systems connect directly to the terminals through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the terminals. In one embodiment the interconnect fabric is a local area network implemented as an Ethernet network. Any other local network may also be utilized. The invention also contemplates the use of wide area networks, the Internet and other networks. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the terminal and the services being accessed. One embodiment contemplates a single-level, switched network, with cooperative (as opposed to competing) network traffic. Dedicated or shared communications interconnects may be used in the present invention.

Terminals

The terminal is the means by which users access the computational services provided by the services. FIG. 1 illustrates terminals 121, 122, and 123. A terminal may consist of a display 126, a keyboard 124, mouse 125, and audio speakers 127. The terminal includes the electronics needed to interface these devices to the interconnection fabric and to transmit to and receive data from the services. In one or more embodiments of the invention, the system has been implemented to allow network terminals to equally interface with devices attached to remote terminals as if those devices were locally available.

Figure 2:
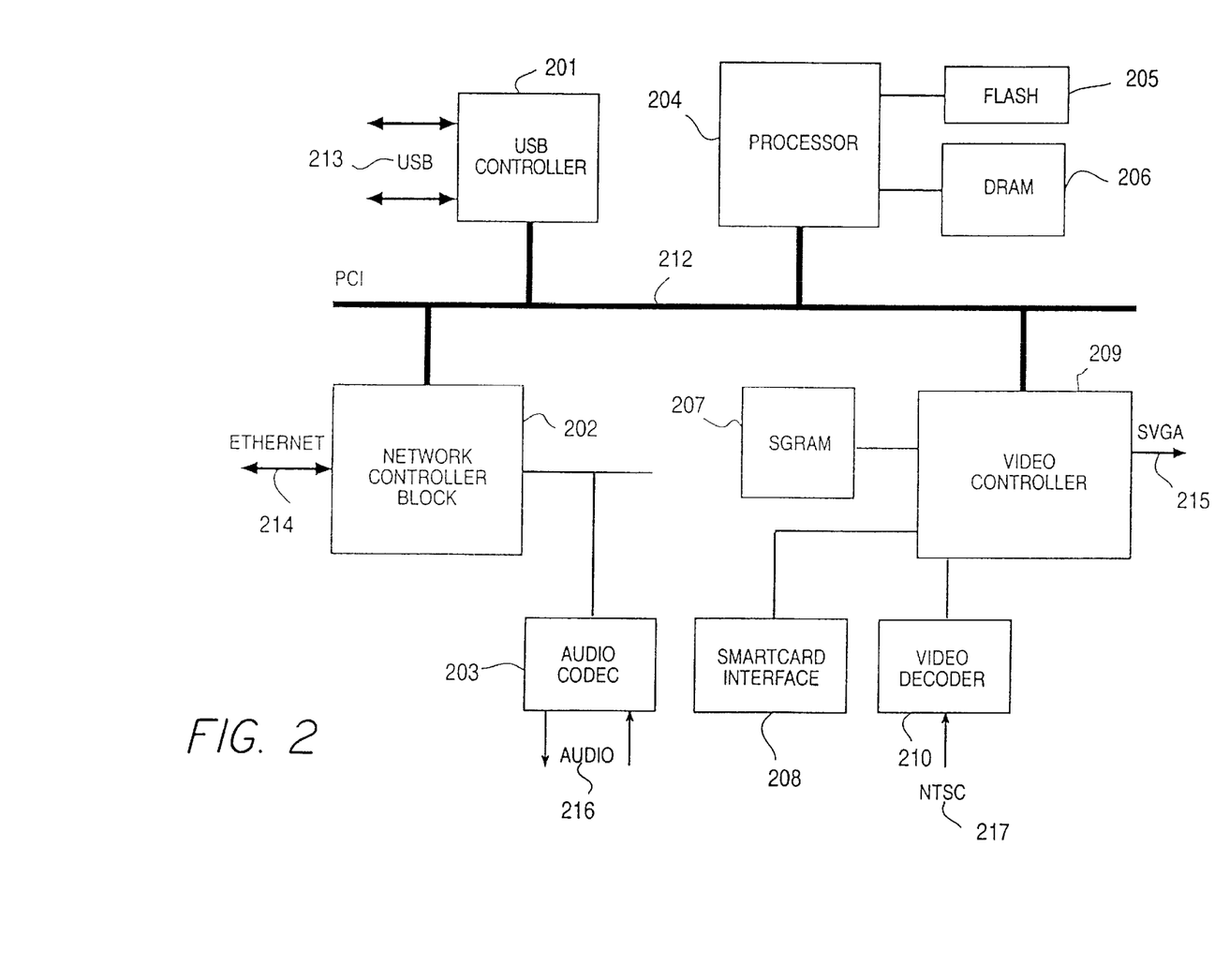
FIG. 2 is a block diagram illustrating the components of a terminal according to one or more embodiments of the invention.

A block diagram of the terminal is illustrated in FIG. 2. The components of the terminal are coupled internally to a PCI bus 212. A network control block 202 communicates to the interconnect fabric, such as Ethernet, through line 214. An audio codec 203 receives audio data on interface 216 and is coupled to block 202. USB data communication is provided on lines 213 to USB controller 201.

An embedded processor 204 may be, for example, a Sparc2ep™ with coupled flash memory 205 and DRAM 206. The USB controller 201, network control block 202 and embedded processor 204 are all coupled to the PCI bus 212. Also coupled to the PCI 212 is the video controller 209. The video controller 209 may be for example, and ATI RagePro+™ frame buffer controller that provides SVGA output on line 215. NTSC data is provided in and out of the video controller through video decoder 210. A smartcard interface 208 may also be coupled to the video controller 209.

Figure 3:
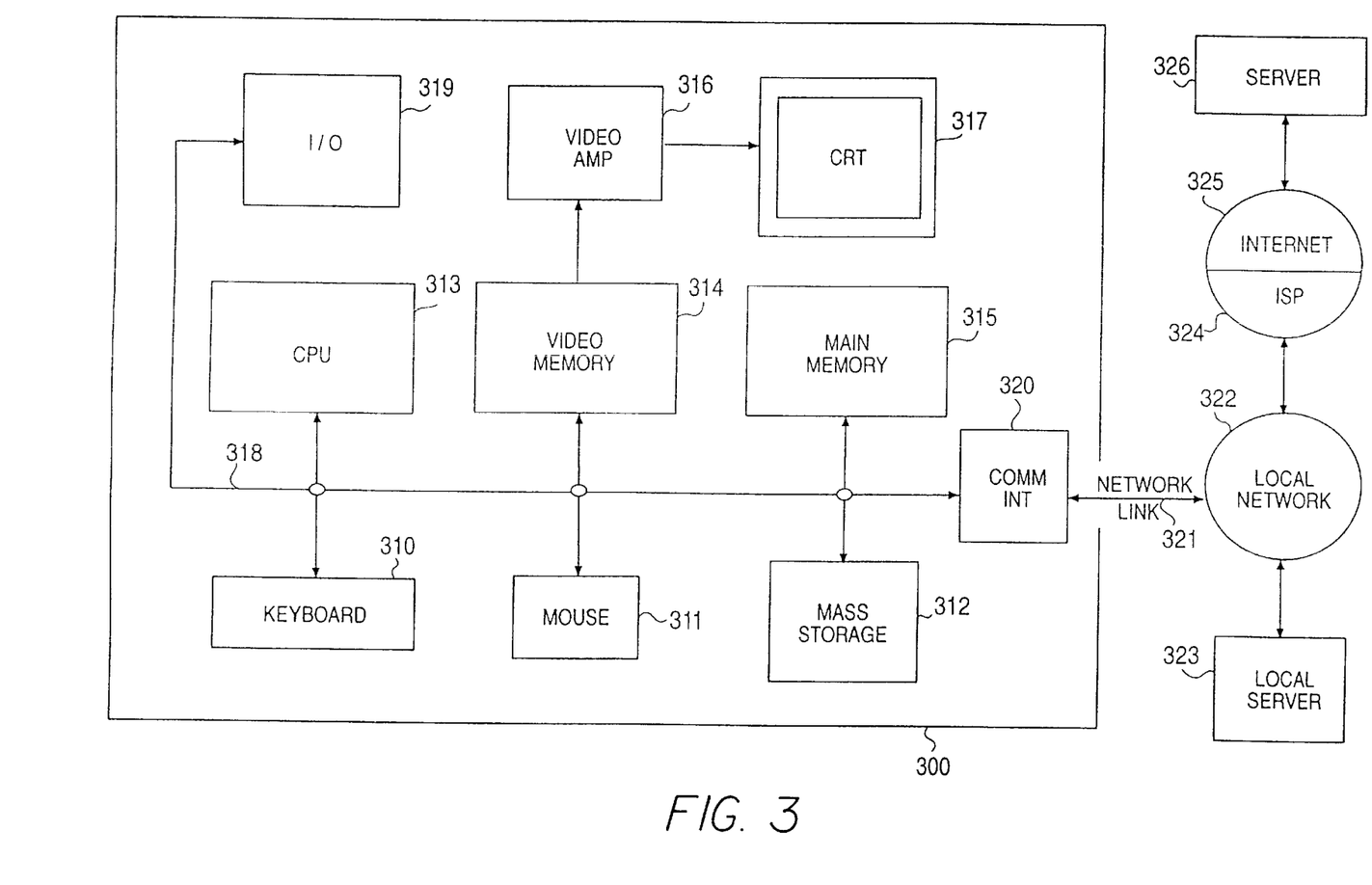
FIG. 3 is a block diagram illustrating the components of a general purpose computer, according to one or more embodiments of the invention.

An embodiment of the invention can be implemented as computer software in the form of computer readable code executed on a general purpose computer such as computer 300 illustrated in FIG. 3, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 310 and mouse 311 are coupled to a system bus 318. The keyboard and mouse are for introducing user input to the computer system and communicating that user input to processor 313. Other suitable input devices may be used in addition to, or in place of, the mouse 311 and keyboard 310. I/O (input/output) unit 319 coupled to system bus 318 represents such I/O elements as a printer, A/V (audio/video) I/O, etc.

Computer 300 includes a video memory 314, main memory 315 and mass storage 312, are coupled to system bus 318 along with keyboard 310, mouse 311 and processor 313. The mass storage 312 may include both fixed and removable media, such as magnetic, optical or magnetic optical storage systems or any other available mass storage technology. Bus 318 may contain, for example, sixty-four address lines for addressing video memory 314 or main memory 315. The system bus 318 also includes, for example, a 64-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

Computer 300 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Wireless links are also possible. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by an Internet Service Provider (ISP) 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Computer 300 can send messages and receive data, including program code, through the network(s), network link 321, and communication interface 320. In the Internet example, remote server computer 326 might transmit a requested code for an application program through Internet 325, ISP 324, local network 322 and communication interface 320. In accord with the invention, one such downloaded application is the apparatus for selecting attachments described herein.

The received code may be executed by processor 313 as it is received, and/or stored in mass storage 312, or other non-volatile storage for later execution. In this manner, computer 300 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

By reducing the desktop unit's function to a well-defined, fixed, set of behaviors, a range of different implementations become possible. For example the terminal could be implemented purely in hardware (e.g. as a board or a chip), it could be implemented as software that controls a small desktop system (e.g. a network computer, personal computer, traditional desktop system), or it could be implemented as an application running on a prior art workstation computer system.

EXCLUSIVE USE OF PERIPHERAL DEVICES

In embodiments of the invention, peripheral devices such as modems, cameras, scanners, microphones, speakers, mice, displays, hard drives are linked to a network terminal. The devices are attached to a user terminal and are used by a user to receive, create and communicate data with other terminals or resources attached to the network. While, typically, a user utilizes a device such as a speaker or a microphone that is attached to his/her terminal, embodiments of the invention have been implemented to allow a user to also access a device attached to a remotely located terminal.

Figure 4:
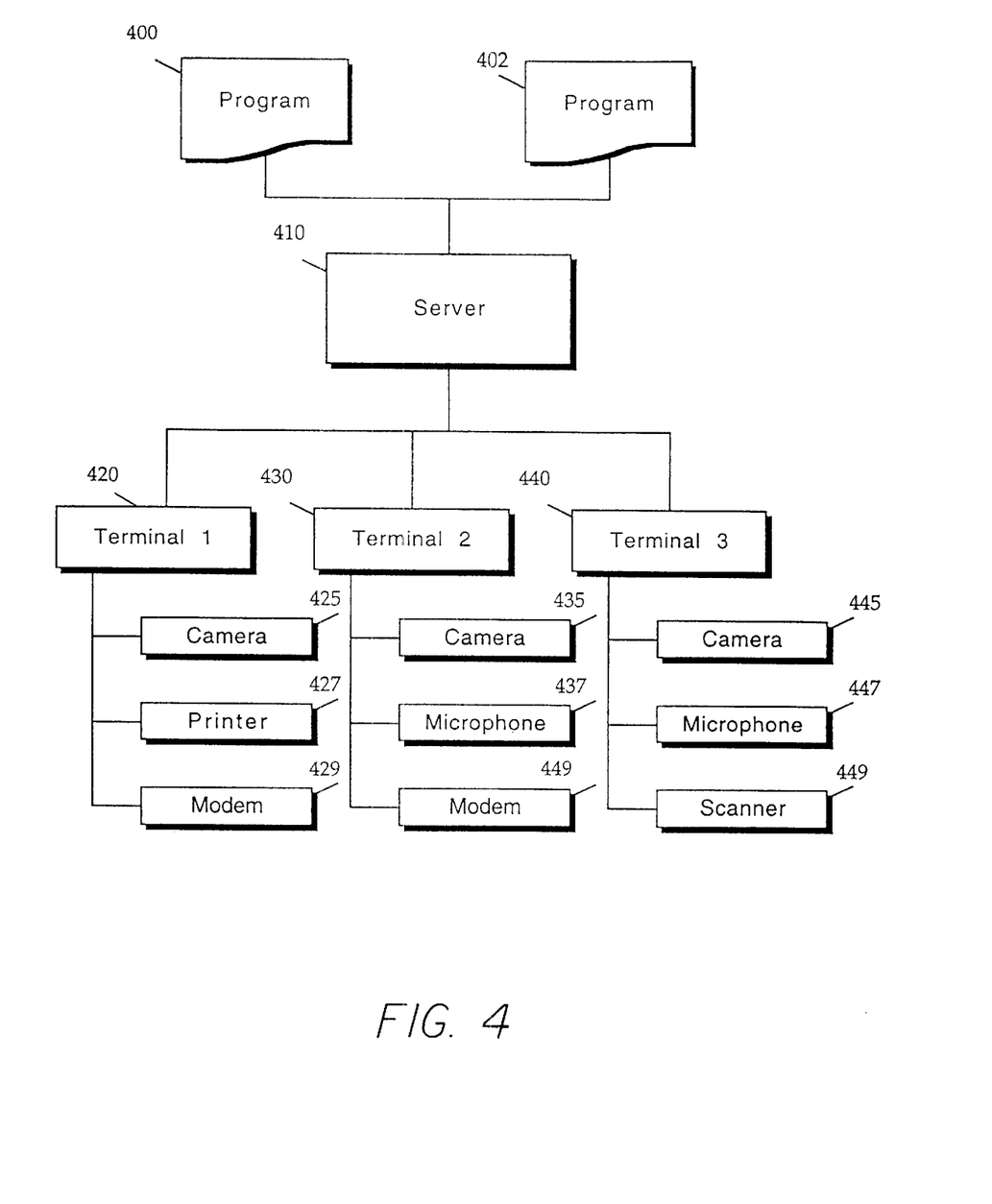
FIG. 4 is a block diagram illustrating various network components and the relationship between network terminals, the server, and peripheral devices that may be attached to a terminal, according to one or more embodiments of the invention.

FIG. 4 is a block diagram illustrating various network components and the relationship between network terminals, the server, and peripheral devices that may be attached to a terminal, according to one or more embodiments of the invention. Embodiments of the invention comprise a program 400 running on server 410, and terminals 1 through 3 connected in a network via server 410. A network user can request to access peripheral devices (i.e., cameras, microphones, modems, etc.) available on various terminals on the network, from any terminal attached to server 410.

Referring to FIG. 4, for example, a user using terminal 2 may be running a program 400 on server 410. Using program 400, said user may want to use microphone 437 attached to terminal 2 in order to save a confidential message. However, another user may be already using microphone 437, for example, by running program 402 to record his personal messages. In one or more embodiments of the invention, program 400 is blocked from accessing microphone 437 while it is in use by program 402, to prevent interference or eavesdropping on information being processed by that program. To accomplish the exclusivity of use for each peripheral device the device is locked by the first requesting program that is granted permission to access the device. Thus, each program has to wait for its turn to lock a peripheral device for use. The locking mechanism is controlled by two protocols: the request protocol and the grant protocol. These protocols establish the rules and procedures for obtaining exclusive access to network peripheral devices.

Request Protocol

The request protocol sets out the rules and the procedures for a program to submit a request for exclusive use of a peripheral device. For example, in one or more embodiments of the invention, program 400 requests exclusive access to a peripheral device such as microphone 437 attached to terminal 2. Program 400 can either be executed on server 410 or on a network terminal, such as terminal 1.

Figure 5:
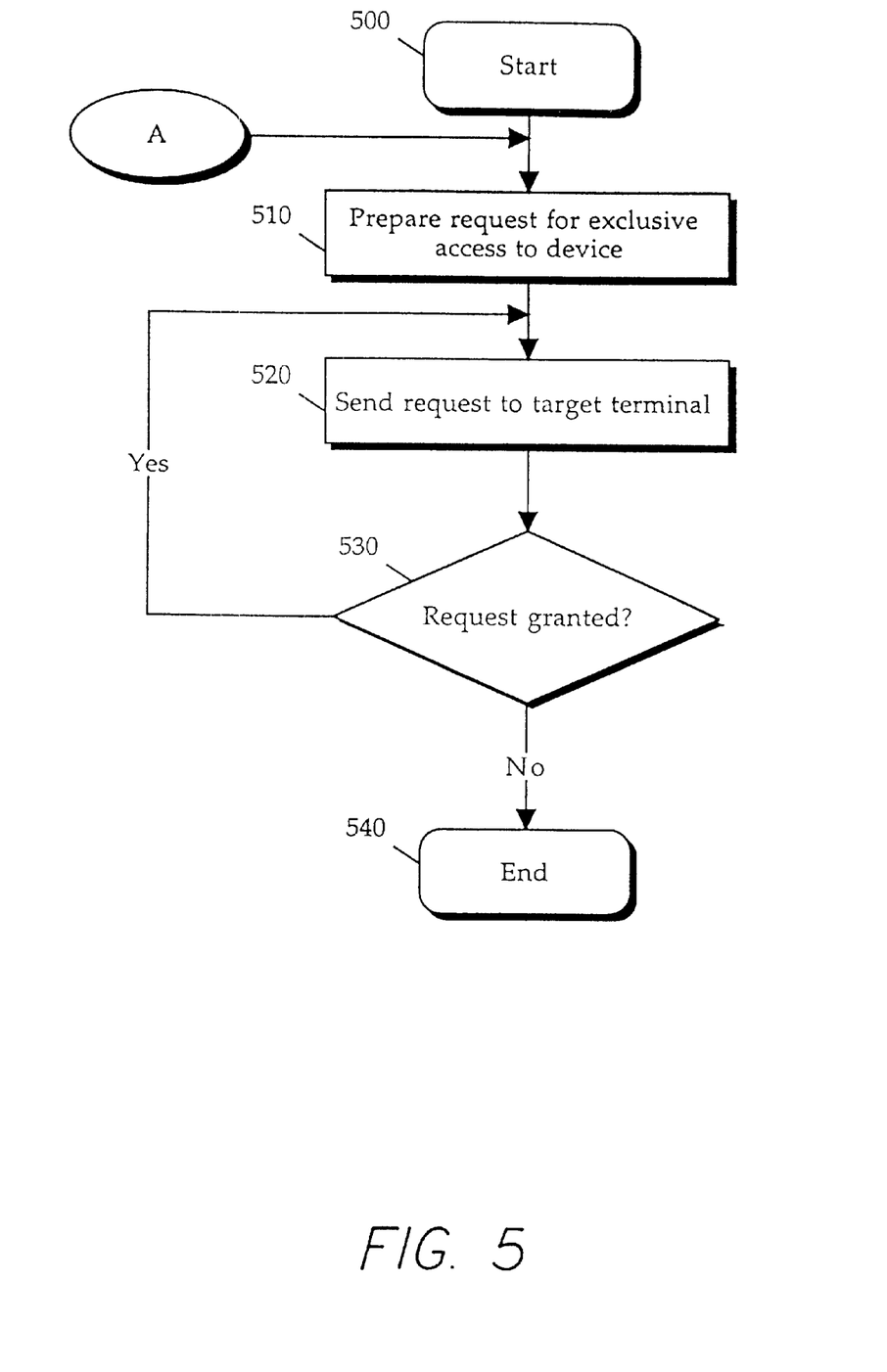
FIG. 5 is a flow diagram illustrating a method by which a request for exclusive access to a peripheral device is prepared and communicated between system components, according to one or more embodiments of the invention.

FIG. 5 is a flow diagram illustrating a method by which a request for exclusive access to a peripheral device is prepared and communicated, according to one or more embodiments of the invention. At step 510, program 400 prepares a request for exclusive access to a peripheral device (e.g., microphone 437) attached to terminal 2. The request includes device parameters and the terminal or program address where device input is to be directed. Device parameters are data used by terminal 2 to activate the target peripheral device or to control the manner in which said device processes data.

For example, in a case where the target device is microphone 437, device parameters may specify the audio channels that are to be used by microphone 437 or the sequence length for the transmission of audio data. For other devices, such as camera 435, other parameters may be sent that control the frame size for video capture, or parameters that control the rate of transmission of data from the device to the requesting program.

At step 520, the request for exclusive access is submitted to terminal 2 (where the target peripheral device resides), and program 400 waits to receive a response on whether or not the submitted request is granted. At step 530, if a response is received indicating that the request for exclusive access is granted, then program 400 gets ready to receive data that is directed to it by microphone 437. The system reverts to step 520, where program 400 continues to resubmit the request periodically to acknowledge that it is still alive. If request for access is denied, at step 540 request protocol terminates. In one or more embodiments of the invention, a new request may be submitted at a later time, in the hope that the device has become available and that the request will be granted.

Grant Protocol

The grant protocol provides for the rules and procedures for processing and responding to a program's request for exclusive access to a peripheral device. If a request is successfully processed the grant protocol maintains a lock on the device for exclusive use by the requesting program, and monitors the locking mechanism in case of any program failures.

Figure 6:
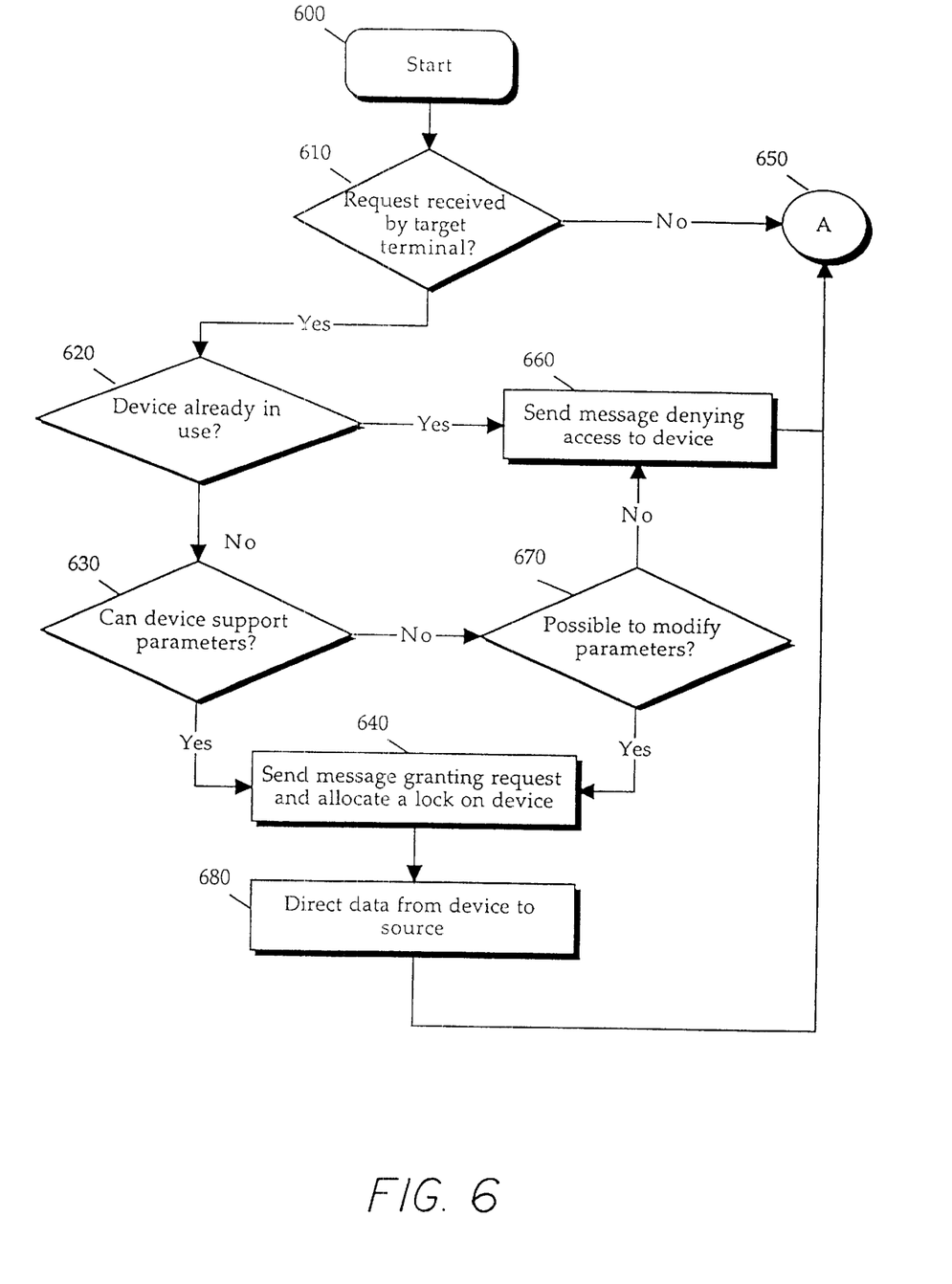
FIG. 6 is a flow diagram illustrating a method by which a request for exclusive access submitted by a program is processed and granted, according to one or more embodiments of the invention.
Figure 7:
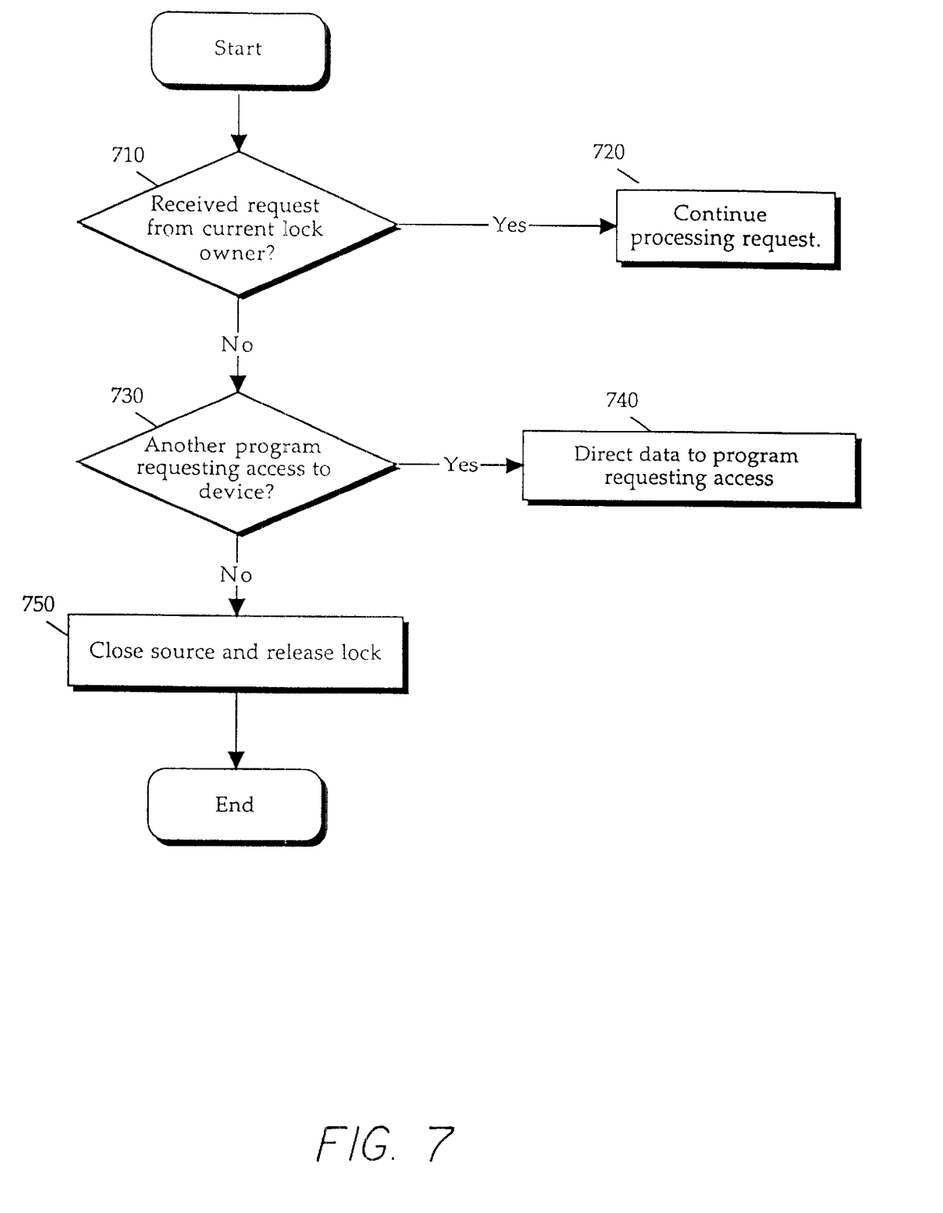
FIG. 7 is a flow diagram illustrating the manner in which the locking mechanism of the invention is monitored.

FIG. 6 is a flow diagram illustrating a method by which a request for exclusive access submitted by a program is processed and granted, according to one or more embodiments of the invention. At step 610, it is determined whether a request for exclusive access is received from any programs (e.g., program 400). If so, at step 620 it is determined whether the device being requested (i.e., microphone 437) is already in use by another program (e.g., program 402). A locking mechanism is utilized to allow multiple programs share a device without the occurrence of a deadlock. The manner in which this locking mechanism is monitored is illustrated in FIG. 7 and is further discussed below. If at step 610 it is determined that the request is not received by the target terminal (e.g., terminal 2) then, in one or more embodiments of the invention, the request is resubmitted at step 650.

At step 620, if it is determined that the device is not in use by another program (i.e., another program has not allocated a lock on the device), then the system proceeds to step 630 where it is determined whether the device can support the requested device parameters submitted with the request. For example, program 400 may have submitted a video request for accessing camera 435 attached to terminal 2. The video request may have included device parameters that provide data regarding the height, width, position, and the scaling of pictures that are captured and transmitted via camera 435. If, for one reason or another, the submitted device parameters are not supported by camera 435, then at step 670 it is determined whether or not it is possible to modify the parameters so that they are compatible with the peripheral device.

If the peripheral device can support the device parameters or the modified device parameters, at step 640 the request is granted, and a confirmation message is sent to the requesting program granting access. As a result the appropriate device is locked for the exclusive use of the requesting program. The confirmation message includes a source address for establishing a virtual connection between the terminal requesting access to the peripheral device (e.g., terminal 1) and the terminal where the device is attached (e.g., terminal 2). As such, the source acts as a port of communication between the two terminals.

If at step 620 it is determined that the requested device is already in use by another program (i.e., locked by another program) and/or if at step 670 it is determined that no possibility for modification of device parameters exists, then at step 660 a message is sent to the requesting program (e.g., program 400) indicating that access is denied. In one or more embodiments of the invention, after sending the denial message, the system proceeds to step 650, where a new request is prepared and resubmitted.

Once the request has been successfully processed, data captured by the peripheral device (e.g. audio, video or other data) is directed to the communication source established exclusively for the requesting program, at step 680. In one or more embodiments of the invention, data transmission is terminated and the lock on the device is released after the requesting program concludes execution.

FIG. 7 is a flow diagram illustrating the manner in which the locking mechanism of the invention is monitored. In one or more embodiments of the invention, data is continuously transported to the requesting program owning a lock on a device, as long as the program periodically submits a request, indicating that the program is still alive (i.e., executing). Thus, in order for a program to maintain its lock on a device, it is necessary for the program to submit further requests at predetermined time intervals. Once a request is received by a target terminal, at step 710 it is determined whether the request was submitted by the program that currently allocates a lock on that device. If so, the system proceeds to step 720 continuing to direct and transport data to the communication port allocated to the program.

If no further requests are submitted by the program owning a current lock (e.g., program 400), within a default time period, at step 730 it is determined whether a second program (e.g., program 402) has submitted a request for accessing the device. If a second program submits a request to access the device where no further requests have been submitted by the first program, the data is automatically directed to the second program, at step 740.

In one or more embodiments of the invention, if the default time period for receiving a request from the program owning a current lock has expired, and there are no other programs waiting to use the peripheral device, then it is presumed that the program has terminated, and therefore at step 750 the communication source is closed and the lock is released, making the device available for use by other programs. In other embodiments however, after the default time period expires, the lock is not released until another program submits a request for access.

For example, consider a scenario wherein program 400 has locked microphone 437, and program 402 is also submitting a request for access. Since the lock allocated to program 400 is exclusive, program 402 will wait until the lock is released. However, if at the time program 402 submits its request the time period for program 400 to submit a new request has already expired, then the system automatically releases the locked device (e.g., microphone 437) and diverts the data to program 402.

The above provisions avoid a deadlock situation if program 400 terminates prematurely without releasing the locked device. A deadlock, typically, refers to the notion of a hung state in a resource management environment, when a resource cannot be accessed because it is locked indefinitely by an application for one reason or another.

Thus, a method and apparatus for controlling the number of users that can concurrently utilize a peripheral device in a computer network is described, in conjunction with one or more specific embodiments. The invention is defined by the claims and their full scope of equivalents.

What is claimed is:

1. A method of limiting concurrent access by multiple programs to a device linked to a terminal in a computer network comprising:

accessing a first program on a server from a first terminal, wherein said server and said first terminal are connected to said computer network and wherein said first program is accessed by said first terminal through said server;

sending a request to use said device from said first terminal via said first program;

allocating a lock on said device by said first program if it is not in use by another program;

denying access by a second program to said device while said device is locked by said lock allocated by said first program; and maintaining said lock for denying access, if said first terminal via said first program periodically submits further requests to use said device.

2. The method of claim 1, further comprising the step of directing data generated by said device to said first terminal via said first program, while said first program maintains said lock for denying accessing on said device.

3. The method of claim 1 further comprising the step of releasing said lock when no further requests have been submitted by said first program after a default time period expires.

4. The method of claim 1, further comprising the step of releasing said lock only when a terminal via said second program sends a request to use said device, if no further requests have been submitted by said first program after a default time period expires.

5. The method of claim 1, wherein said request includes device parameters for controlling said device.

6. The method of claim 5, wherein said first program is denied access to said device if said parameters are incompatible with said device.

7. The method of claim 5, wherein said parameters are modified if they are incompatible with said device.

8. The method of claim 1, wherein said first terminal requires said first program to access, lock, and use said device.

9. The method of claim 1, wherein said device is connected to a second terminal, wherein said second terminal is connected to said computer network, and wherein said first terminal via said first program access said device through said second terminal.

10. The method of claim 9, wherein said second program is located on said server and wherein said second program can only be accessed through said server.

11. The method of claim 1, wherein said server provides a computation service to said first terminal.

12. A computing system architecture comprising:

a server;

first and second terminals, having one or more devices, said first and second terminals interconnected through an interconnect fabric with one another and said server;

first and second programs located on said server, wherein said first terminal assessing said first program through said server and wherein said first terminal via said first program requesting access to said one or more devices;

said first program allocating a lock for denying access by said second program to at least one of said devices on said second terminal if it is not in use by said second program;

said first program maintaining said lock for denying access on said device, if said first terminal via said first program periodically submits further requests to use said device.

13. The computing system architecture of claim 12, wherein data generated by said device is directed to said first terminal via said first program, while said first program maintains said lock for denying access on said device.

14. The computing system architecture of claim 12 said lock is released when no further requests are submitted by said first program after a default time period expires.

15. The computing system architecture of claim 12, wherein said lock is released only when a terminal via second program sends a request to use said device, if no further requests are submitted by said first program after a default time period expires.

16. The computing system architecture of claim 12, wherein said request includes device parameters for controlling said device.

17. The computing system architecture of claim 16, wherein said first program is denied access to said device if said parameters are incompatible with said device.

18. The method of claim 16, wherein parameters are modified if they are incompatible with said device.

19. The computing system architecture of claim 16, wherein said first terminal requires said first program to access, lock, and use said device.

20. The computing system architecture of claim 12, wherein said server provides a computation service to said first terminal.

21. A computer program product comprising:

a computer usable medium having computer readable program code embodied therein configured to limit concurrent access by multiple programs to a device linked to a terminal in a computer network; said computer program product comprising:

computer readable code within a first terminal configured to cause said first terminal to access a first program on a server and to cause said first program to send a request to use said device, wherein said server and said first terminal are connected to said computer network and wherein said first program is accessed by said first terminal through said server;

computer readable code within said first program configured to cause a computer to allocate a lock on said device if it is not in use by another program;

computer readable code configured to cause a computer to deny access by a second program to said device while said device is locked by said lock allocated by said first program; and computer readable code configured to cause a computer to maintain said lock for denying access, if said first terminal via said first program periodically sends further requests to use said device.

22. The computer program product of claim 21, further comprising computer readable code configured to cause a computer to direct data generated by said device to said first terminal via said first program, while said first program maintains said lock for denying access on said device.

23. The computer program product of claim 21 further comprising computer readable code configured to cause a computer to release said lock when no further requests are submitted by said first program after a default time period expires.

24. The computer program product of claim 21, further comprising computer readable code configured to cause a computer to release said lock only when a terminal via said second program sends a request to use said device, if no further requests are submitted by said first program after a default time period expires.

25. The computer program product of claim 12, wherein said request includes device parameters for controlling said device.

26. The computer program product of claim 25, wherein said first program is denied access to said device if said parameters are incompatible with said device.

27. The computer program product of claim 25, wherein parameters are modified if they are incompatible with said device.

28. The computer program product of claim 21, wherein said first terminal requires said first program to access, lock, and use said device.

29. The computer program product of claim 21, wherein said device is connected to a second terminal, wherein said second terminal is connected to said computer network, and wherein said first terminal via said first program accesses said device through said second terminal.

30. The computer program product of claim 29, wherein said second program is located on said server and wherein said second program can only be accessed through said server.

31. The computer program product of claim 21, wherein said server provides a computation service to said first terminal.

* * * * *